April 15, 1930.  C. GROH  1,754,790
AUTOMATIC CONTROL DEVICE FOR AIRCRAFT
Filed Nov. 4, 1927  4 Sheets-Sheet 1
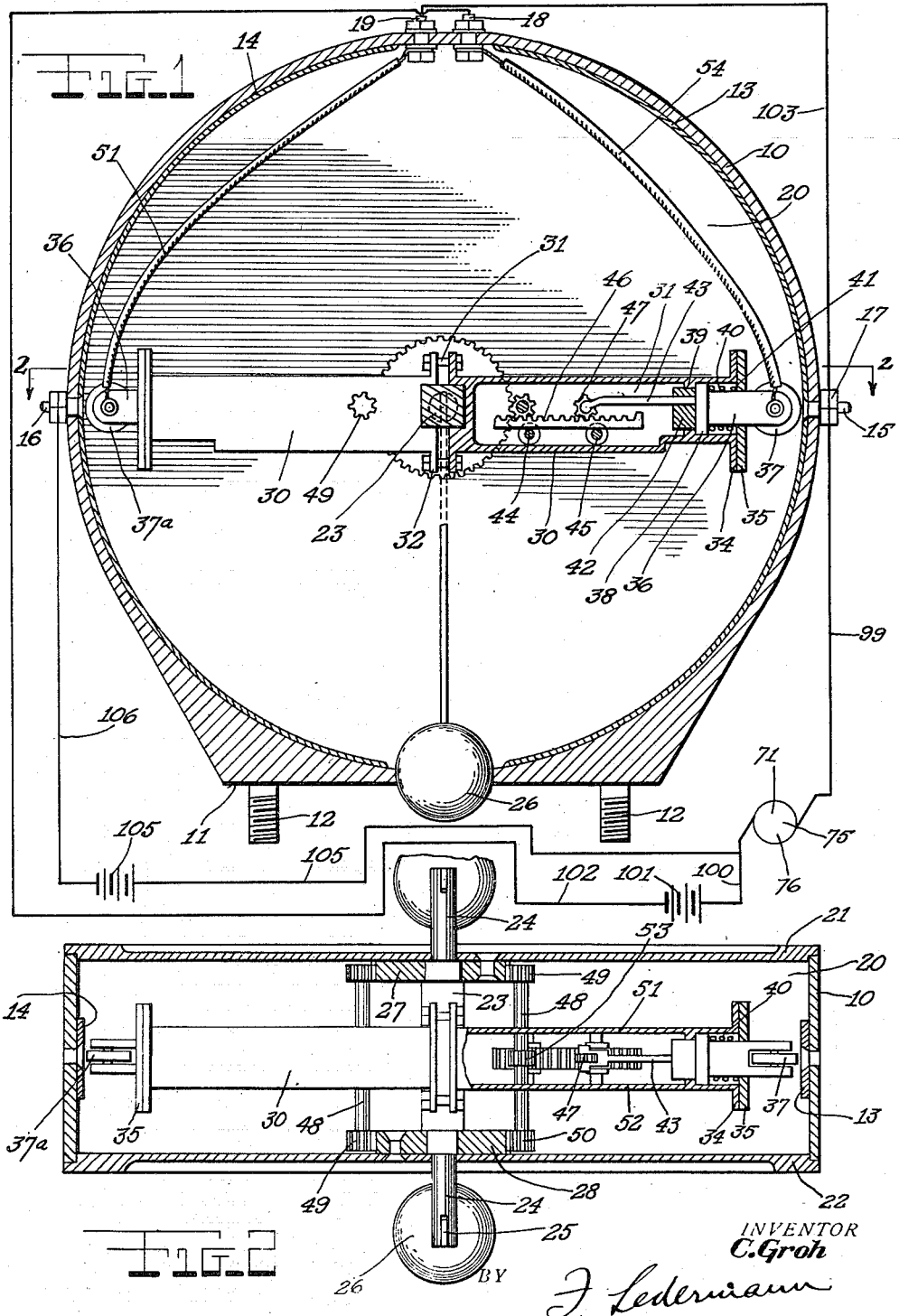

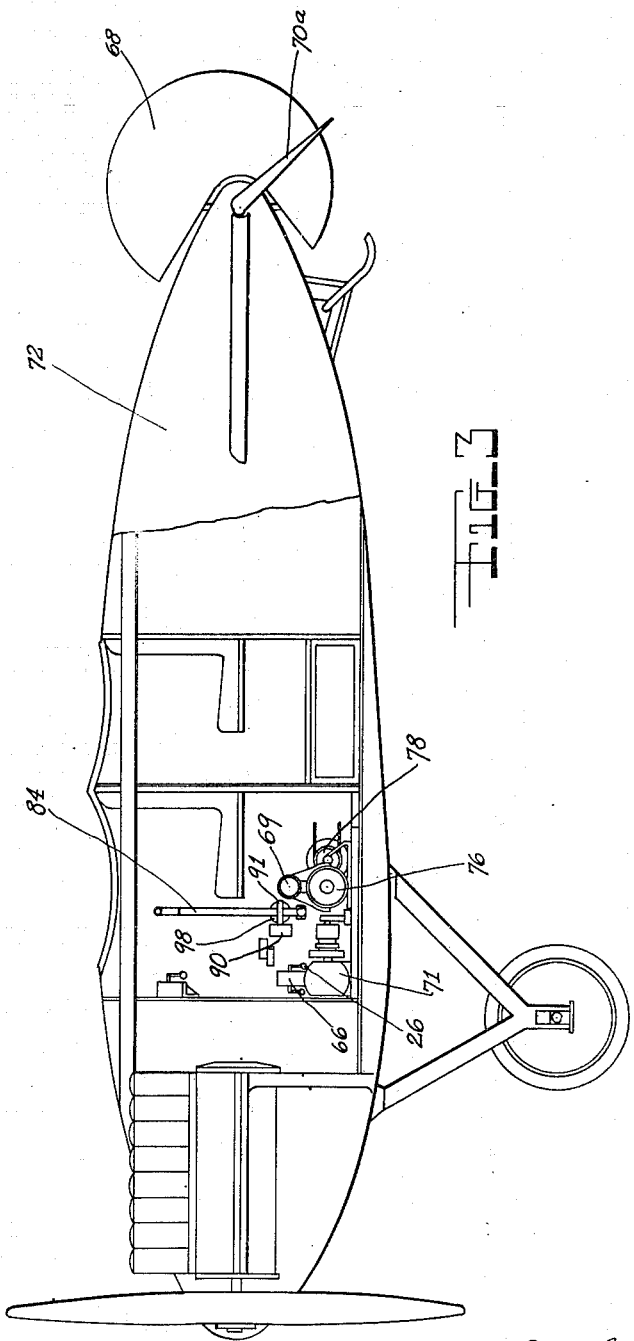

April 15, 1930. C. GROH 1,754,790
AUTOMATIC CONTROL DEVICE FOR AIRCRAFT
Filed Nov. 4, 1927 4 Sheets-Sheet 3
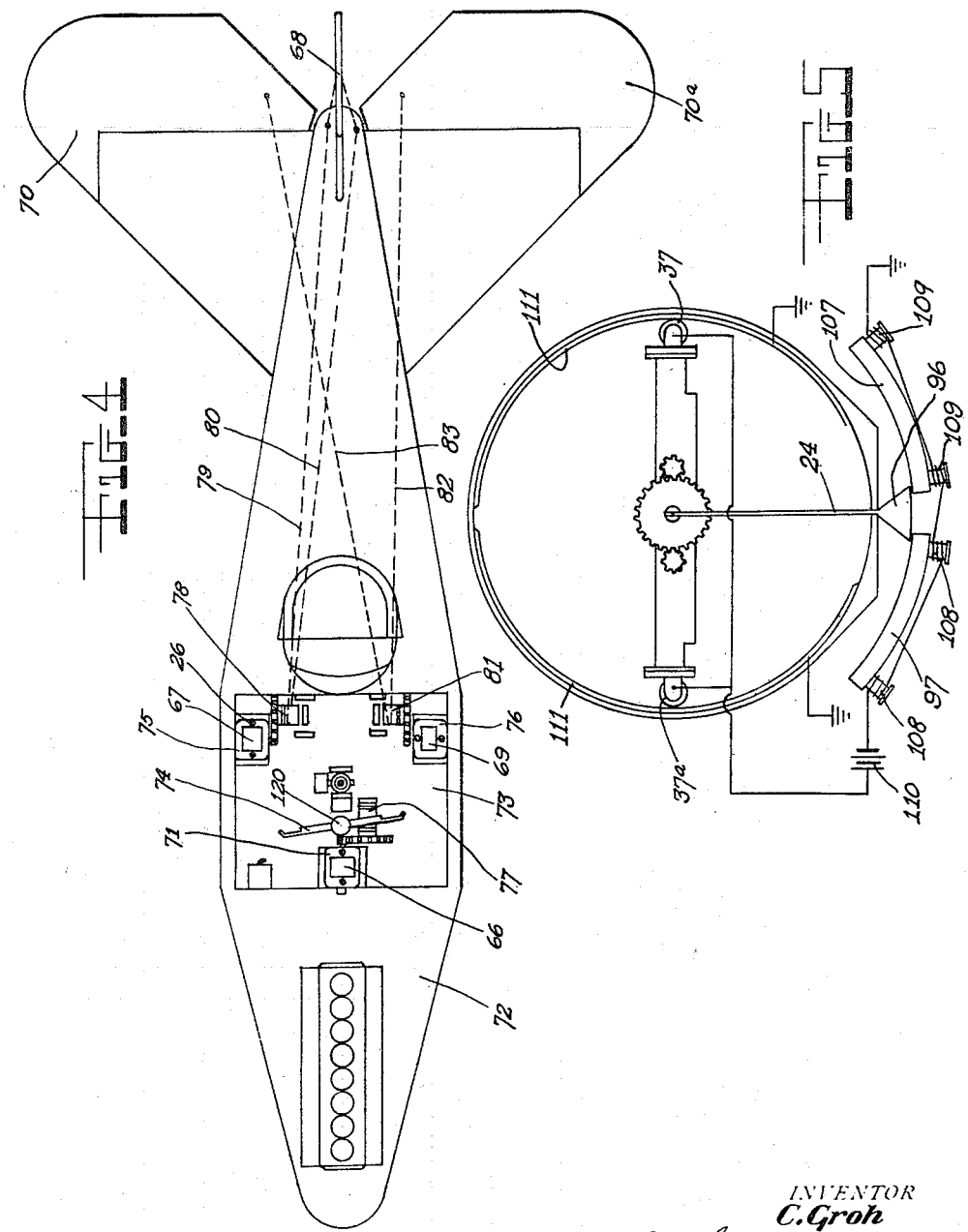
INVENTOR
C. Groh
BY J. Ledermann
ATTORNEY April 15, 1930. C. GROH 1,754,790
AUTOMATIC CONTROL DEVICE FOR AIRCRAFT
Filed Nov. 4, 1927 4 Sheets-Sheet 4
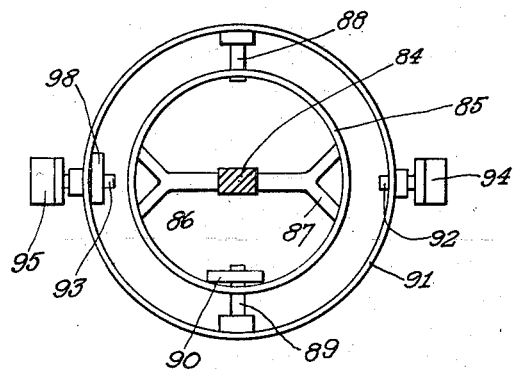
FIG. 6
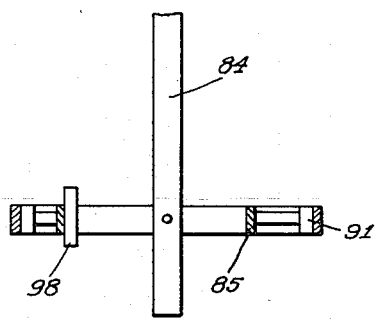
FIG. 7
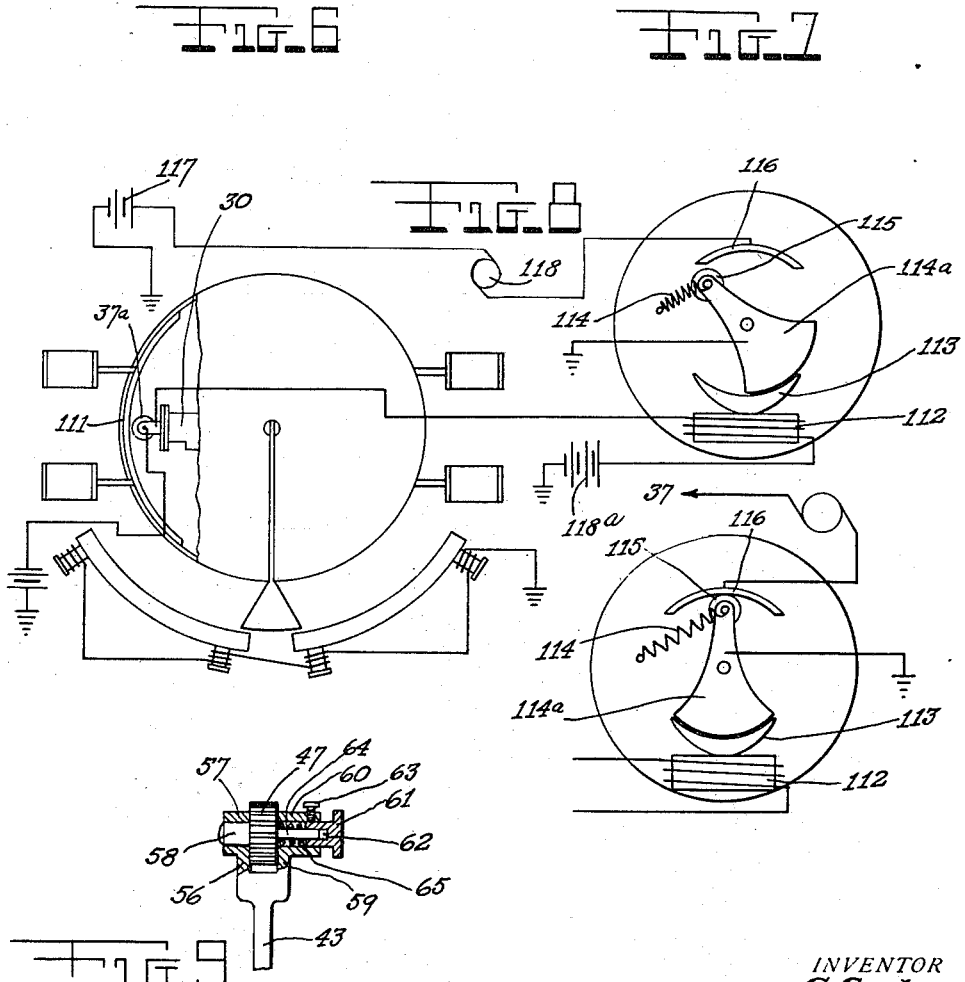
FIG. 8
FIG. 9
INVENTOR
C. Groh
BY F. Ledermann
ATTORNEY Patented Apr. 15, 1930

1,754,790

UNITED STATES PATENT OFFICE

CHRISTIAN GROH, OF CALDWELL, NEW JERSEY

AUTOMATIC CONTROL DEVICE FOR AIRCRAFT

Application filed November 4, 1927. Serial No. 231,053.

The main object of this invention is to provide a steering apparatus consisting of a pendulum actuated instrument which controls and corrects the steering of all types of aircraft. The device is essentially used to control the elevators and rudders of aeroplanes when they deviate from a straightaway course.

Another object of this invention is to provide a mechanism which is controlled and actuated by the movement of the pendulum, which movement throws into contact circuit closing elements which close a circuit through a motor and rectify the positions of the elevators and rudders of an aircraft when they deviate from a straightaway course.

The above and other objects will become apparent in the description below, in which characters of reference refer to like-named parts in the drawing.

Referring briefly to the drawing, Figure 1 is a longitudinal sectional elevational view through a control box, showing the mechanism used for closing the contact of the mechanism.

Figure 2 is a cross sectional plan view of Figure 1, taken on line 2—2 of Figure 1.

Figure 3 is a side elevational view of the fuselage of an aeroplane showing the control mechanism mounted in place in the cockpit.

Figure 4 is a top plan view of the aeroplane fuselage showing the location of the control mechanism mounted in the cockpit.

Figure 5 is a sectional elevational view of a modified type of control device showing means for dampening the action of the pendulum.

Figure 6 is a top plan view of the control stick of an aeroplane, showing the arrangement of the mechanism as used in semi-automatic steering.

Figure 7 is a sectional side elevational view of Figure 6.

Figure 8 is a schematic composite view of a modification showing an electrical method of closing a circiut through a motor and means for dampening the swing of the pendulum.

Figure 9 is a longitudinal sectional elevational view of a portion of the mechanism, showing the means for frictionally cushioning the travel of a pinion used in the device.

Referring in detail to the drawing, the numeral 10 indicates the cylindrical wall of a hollow casing. This wall is enlarged at its lowermost position into a flat surface 11 from which threaded studs 12 extend downwardly. These studs are adapted to slip through openings in shelves or similar members which are constructed in the cockpit of an aeroplane. The interior surface of the wall 10 has mounted thereon a pair of semi-circular shoes 13 and 14 which are oppositely disposed to each other and are constructed of some electrical current carrying material. These shoes have terminals 15 and 16 in electrical contact therewith. The terminals extend through the casing and project outwardly therefrom and have nuts 17 thereon for securing a lead wire to the terminal stud. A pair of additional terminals 18 and 19 are mounted on the casing 10 but installed from the latter and serve as connections for lead wires extending to these terminals as a circuit. The wall 10 forms therein a circular chamber 20 in which the mechanism is located for correcting the balance of an aircraft or aeroplane on a straightaway path. The side of the cylindrical wall 10 is closed by face plates 21 and 22 which may be secured in place in any desirable manner. A square spindle 23 passes axially through the casing and its projecting ends 24 are rotatably journaled in the face plates 21 and 22. The gears 27 and 28 are rigidly mounted to the casing and when the aircraft in which the casing is mounted tilts in either direction the gears tilt with the casing as they are rigid therewith.

The square section 23 of the shaft which is contained within the chamber 20 of the casing has a pair of housings 30 mounted thereon. These housings are secured upon the square sections 23 of the shaft by passing bolts 31 through flanges 32, which latter are formed on the mutually adjacent ends of the housings. The housings are rectangular in cross section and have a compartment 33 therein where a contact making mechanism is positioned. These housings are oppositely disposed toward each other and are on the same axial plane, the axis of the housings passing through the axis of the square shaft 23 and normally are horizontal. The opposing ends of these housings extend to a position which is short of the shoes 13 and 14 and these opposing ends have externally projecting flanges 34, to which cover plates 35 are secured. The cover plate has an opening in which a slidable bolt 36 is located. This bolt 36 has a bifurcated end which projects externally of the housing and forms bearings for a roller 37. The bolt passes into the housing, as stated, through the cover plate 35 and has a head 38 at the end located within the housing, this head normally being urged to seat upon the internal bolt 39 by a coiled spring 40, which is wound about the bolt 36 between the head 38 and an internal flange 41. The bolt 39 limits the movement of the bolt 36 inwardly when the roller is shifted out of contact with its complemental shoes either 13 or 14. It is to be noted that both of these housings contain the same identical mechanism and the characters which refer to the elements in one of the housings also are to refer to the elements in the adjacent housing. Mounted within the internal shoulder 39 is a guide block 42 which has an opening therein through which slidably passes a rod 43 whose one end is secured to the head 38 of the bolt 36. The purposes and construction of this rod will be more fully hereinafter described.

The housings between the guide block 42 and the end attached to the shaft have studs 44 and 45 mounted crosswise therein and these studs serve as a table or rest upon which a rack bar 46 is slidable longitudinally in said housings. This rack bar meshes with a pinion 47 which is mounted rotatably on the end of the rod 43 but is frictionally held in a stationary position, and contact between the rollers 37 or 37ᵃ with the complemental shoes 13 or 14 or the seating of the head 38 upon the shoulder 39 overcomes this frictional resistance. The inner extremity of the rod 43 has the pinion 47 rotatably mounted thereon. This rod 43 is bifurcated at its inner end. One extension 56 on one side of the bifurcation is formed into a bearing 57 in which the axle 58 is journaled, as illustrated in Figure 9. This axle forms an integral part of the pinion 47 and projects outwardly from one face of the latter. The opposite extension 59 on the other side of the bifurcation has a sleeve 60 formed thereon. This sleeve has an internal bore which is threaded throughout its length and threadably receives a hollow cap screw 61 which is provided with a bore 62. This cap screw is adapted to be secured in adjacent positions by a seat screw 63. The bore 62 of the cap screw 61 rotatably receives the end of an axle 64 therein. This axle projects from the face of the pinion 47 opposite to the axle 58, and is substantially of lesser diameter than the latter. Within the bore of the sleeve 60, between the face of the pinion 48 and cap screw 61, a coiled spring 65 is positioned. The tension of this spring may be varied by screwing the cap screw 61 in or out of said sleeve 60, and said spring exerts a frictional pressure upon the pinion 47 to prevent the latter from idling and retain it at its normally set position upon the rack bar 46 with whose teeth said pinion lies constantly in mesh. At all other times the pinion is stationary and travels with the rack bar. Each housing has a spindle 48 passing transversely through the housing above the rack bar. The ends of this spindle 48 have pinions 49 and 50 attached thereto which mesh with the opposing gears 27 and 28 respectively. The spindle is journaled in the side walls 51 and 52 of the housings and, centrally of its length, has an additional pinion 53 formed thereon which mesh with the teeth of the rack bar 46.

The roller 37 is electrically connected to the terminal 18 through an insulated lead wire 54, and the opposing roller 37ᵃ is electrically connected to the terminal 19 through a lead wire 55, as illustrated in Figure 1.

The mechanism within the casing 10 in Figure 1 and the casing itself, is termed a unit in this application. To completely control the steering of an aeroplane, three of these units are necessary. Each of these units are identical in construction, but are located at different positions and are differently arranged according to the mechanism which the particular unit is to control. The unit whose casing is indicated by the number 66 in Figure 4 controls the ailerons which are hinged to the wing surface and may be of the dual or mono type. The unit within the casing 67 in Figure 4 controls the adjustment of the directional steering rudder 68 and the unit in the casing 69 controls the adjustment of the elevators 70. Each of these units 66, 67 and 69 are mounted upon a motor. The motor 71 surmounted by the control unit 66, whose pendulums are adapted to swing crosswise in the fuselage 72 of the aeroplane, is mounted in the front of the cockpit 73, directly in front of the rudder bar 74. The motor 75 is surmounted by the casing 67 and is located in a corner of the cockpit, and is used to actuate the rudder controls. The pendulums of the unit 67 are adapted to also swing transversely in the fuselage of the aeroplane. The unit 69 is mounted on an electrical motor 76 and the pendulums of this unit are adapted to swing in a longitudinal direction within the cockpit of the fuselage. All of these motors 71, 75 and 76 rotate drums through means of gears. The motor 71 is adapted to rotate a drum 77 around which four cables are trained. In aeroplane construction each aileron is controlled in its movement by the paying out of an upper cable and the taking in of a lower cable, when the aileron is to be pivotally lowered or the reverse, when it is to be lifted. These cables which are attached to the ailerons are trained about the drum 77, the upper cable passing tangentially around the upper half of the drum while the remaining cable passes tangentially around the lower half of the drum. The cables of the reverse aileron operate in a reverse direction and the cables leading thereto are consequently reversed.

The motor 75, through means of gears, is connected to a drum 78 around which several turns of a cable is trained. The ends 79 and 80 of this cable pass rearwardly in the fuselage of the aeroplane and the outer ends are connected to opposite sides of the steering rudder 68. A third drum 81, rotated by the motor 76, is provided in the cockpit and is adapted to actuate cables which adjust the position of the elevators 70 and 70ª. These elevators are usually used in pairs, one on either side of the rudder and are lowered or raised about a pivot point without the manual operation by a pilot of the control stick. In an aeroplane which is equipped with these full automatic control units the stick may be provided with an additional mechanism which permits a semi-automatic control of the ship. This semi-automatic control of the ship begins to function after the pilot of the ship has overbanked or set the ship off its balance and has consequently thrown said ship off an even keel. In this semi-automatic mechanism the control stick 84, by means of which the ailerons and elevators are usually actuated, is provided with a construction upon which the units, illustrated in Figure 1 and Figure 2, are mounted, in such manner that when the keel of the ship is thrown off balance, one of these units will react to this unbalancing of the control cables. The control stick 84 is so mounted in the usual construction that its lower end may swing in any direction required. A control ring 85 bounds the stick at its axis. This ring has arms 86 and 87 thereon which are connected to the stick 84 at its pivotal point. This ring is pivoted at diametrically opposite positions on studs 88 and 89. The stud 89 has one of the units, which is indicated by the numeral 90, illustrated in detail in Figures 1 and 2, mounted thereon. This unit 90 is identical to that shown in Figures 1 and 2 of the drawings, but is not provided with a pendulum such as that indicated by the numeral 26. The studs 88 and 89 project inwardly from a ring 91 which is larger than the ring 85 and is on the same axis as the inner ring. This outer ring 91 is mounted on studs 92 and 93 which are journaled in brackets 94 and 95, the latter being located at a position at right-angles to the studs 88 and 89. The stud 93, which supports one side of the outer ring 91, has another of the units 98, which is similar to the unit 90 and is illustrated in Figures 1 and 2 of the drawings, mounted thereon. This unit 98 also is not provided with a pendulum. It will be noted that in this semi-automatic arrangement in which the pilot may control the ship if his adjustment of the plane surfaces is perfect, that the casings of the units 90 and 98 are secured to their respective rings while the studs 89 and 93, which pass thru these casings, are connected to the shafts 24 or a substitute for these shafts.

The control apparatus, illustrated in the various modifications in the drawings, is adapted to serve as a means for semi-automatically steering a ship. In the semi-automatic apparatus two units 98 and 90 are used. These units are identical in construction to that illustrated in Figures 1 and 2 with the exception of the pendulums, with which these units are not equipped. When a pilot, with the semi-automatic apparatus illustrated in Figures 6 and 7, wishes to maneuver the ship on a straightaway air course, he manipulates the ailerons and elevators and rudder of the aircraft through means of the control stick, indicated by the numeral 84. As he rectifies the unbalanced position of the elevators or ailerons and this control moves past the critical degree of adjustment of the stick, the ship will again be overbalanced in the reversed direction. As this occurs the one or the other of the units, or both, begin to function to correct this overbalancing effect upon the ship. A unit 120, such as those which are indicated by the numerals 90 and 98, is applied to the rudder 74 and is used when the rudder is under semi-automatic control.

The control units used with the semi-automatic and fully automatic control are identical as stated previously, but instead of the pendulums compensating the adjustment of the elevators and ailerons in the semi-automatic units, the control stick accomplishes this movement.

The units in the fully automatic units, illustrated in Figure 2, operate in the following manner: Normally the housings 30 are located within the casings in accurate horizontal position and when these housings are located in such position the rollers 37 and 37ª and the structure connected thereto is in retracted position and not in contact with either of the shoes 13 or 14. The surface 11 of the casings is mounted upon a shelf or the like, which, when the ship assumes a straightaway horizontal course is also horizontal. One of these units is placed in the cockpit of the aircraft in such position above a motor 75 that its pendulums 26 swing in a transverse position across the ship. This particular unit controls the rudder 68. Another unit 66 is similarly arranged in the cockpit, that is, its pendulums 26 also swing in a transverse direction and this particular unit controls the adjustment of the aileron surfaces, not shown on the drawings. A third unit 69 is constructed in the manner illustrated in Figures 1 and 2 and is so arranged in the cockpit of the aircraft that its pendulums 26 swing fore and aft, and control the adjustment of the elevators 70 and 70ª. Assuming that an aeroplane is pursuing a straightaway horizontal directional course and meets with a contrary wind pressure upon its plane surfaces, the wings will be affected and will cause the same to tilt in one or the other direction. This unbalances the casing 10 of the unit 66. As the casing 10 of this unit is unbalanced the pendulum retains the housings 30 in accurate horizontal position, but these housings with respect to the casing, have now been slightly rotated and this rotational movement is communicated to member 36 and one of the rollers 37 or 37ª, which particular roller is then extended out of the housing to come in contact with one or the other of the shoes 13 or 14 and thus close a circuit to a motor which will be more fully hereinafter described. This movement of the roller into contact with the shoe is provided by a mechanism consisting of the spur gears 27 and 28 which are mounted rigidly to the casing on opposite sides, being secured to the members 21 and 22. A shaft 48 passes through, and is journaled, in each of the housings 30. The ends of these shafts have pinions 49 and 50 mounted thereon which mesh with the spur gears 27 and 28 respectively. As the casings are tilted and the housings 30 remain in horizontal position due to the influence of the pendulums 26 upon the square shaft 23 to which the housings are secured, rotation of these pinions 49 and 50 and the shaft 48 ensues. The shaft 48 has an additional and third pinion 53 secured to it within each of the housings. This pinion 53 meshes with a rack bar 46 which is caused to be moved in one or the other directions according to the rotation of the pinion 53. When the casing 10 tilts in a clockwise direction, with respect to Figure 1, the rack bar 46 will be moved outwardly or toward the free end of the housing. This rack bar as it meshes with a pinion 47, which is frictionally held rigid to an arm 43, moves this arm outwardly. The arm is connected to a bolt 36 on which the contact rollers 37 or 37ª are rotatably mounted. As the bolt 36, in one of the housings 30, is extended to cause its roller to contact with one of the shoes 13 or 14, the bolt in the opposite housing is retracted on a corresponding distance. This closes contact through either of the motors 71, 75 and 76 through a lead wire 99 which latter is connected to the terminal 15 of the shoe 13 and its opposite end terminals are connected to the terminals of the motor. The circuit from the motor passes through a lead 100 into a battery 101 and then through a lead wire 102 which is connected to a terminal 18 passing through a lead wire 54 which is electrically contacted with the roller 37, a slidable bolt being formed of some insulating material.

When the ship rotates in a clockwise direction, with respect to Figure 1 of the drawings, the roller 37 is retracted simultaneously with the extension of the roller 37ª. This extension of the roller 37ª causes the latter to contact with the shoe 14 and this contact closes a circuit through the lead wire 51, terminal 19, lead wire 103 to the terminal 15 thence through the lead wire 104 into the battery 105 and then completing the circuit through a lead wire 106 which is connected to the terminal 16 of the shoe 14 with which the roller 37ª then lies in contact. It will be noted that providing these two circuits with individual batteries the motor is capable of reversible rotation which is necessary in the proper functioning of the control device. When one or the other of the slidable bolts 36 is retracted the opposite bolt is advanced, but in retraction of either of these bolts the retractive movement is limited by the flange 39 upon which the head 38 of the bolt seats when fully retracted. As the rack bar may have a greater movement than the required movement of the slide bolt 36 an escapement is necessary. This escapement is provided and is illustrated in Figure 9 in which the pinion 47 is frictionally held rigid to the rack bar until the head 38 of the slide bolt 36 seats itself upon the flange 39. As the rack bar proceeds farther inwardly in its movement the spring 65, which holds the pinion frictionally against rotation, slips on said pinion and permits rotation of the said pinion, thereby permitting the individual movements of the slide bar with respect to the rack bar, although they are frictionally retained in place with respect to the position that the one holds to the other. As either one of these motors, actuated by the particular control units is set into operation through closing of one or the other of its circuits, the drum 81, 78 or 77 is rotated in one or the other directions. As the cables of the ailerons or the cables of the rudders 79 and 80 or the cables of the elevators 82 and 83 are trained about these drums, an adjustment of the elevators 83 and 82 are trained about these drums, and an adjustment of the rudder, elevators or ailerons is made until the ship again lies on an even keel, after which the roller will be released from contact with its particular shoe which occurs after the pendulums 26 have again assumed horizontal position.

In Figure 5 a dampening device for limiting the swinging of the pendulum is shown. In this modification the pendulum bobbin 19 is of substantially pyramidal shape with the lower surface arcuate. Below the circular housing, on either side of the vertical plane through the center, iron magnet poles 97 and 107 are mounted. At either end of each of the magnet poles bobbins 108 and 109 are attached, the bobbin 108 being so wound as to induce a magnetic flux in one direction in the shoe 97 and the bobbin 109 being oppositely wound to produce an opposite flux in the shoe 107. The four bobbins are connected in series, the end one on the right being grounded and the end one on the left being connected to the negative terminal of a battery 110. The positive terminal of the battery is connected to both roller 37 and roller 37ª. On either side of the control housing arcuate contact shoes 111 are secured and both shoes are grounded. It is therefore apparent that when the plane varies its position from the horizontal, either roller 37 or roller 38 will contact with its adjacent shoe 11 closing the circuit through the bobbin 108 and bobbin 109. The shoes 97 and 107 will therefore become the opposite poles of a magnet and the pyramid bobbin 106, swinging between the poles, will be attracted to a position midway between the adjacent ends of the respective poles, as the magnetic flux will be of greatest intensity at the said ends. Therefore the swinging motion of the pendulum will be dampened, and a quicker stabilizing of the plane will result.

A further modification of the control magnet is illustrated in Figure 8. This modification embodies the pendulum dampening elements shown in Figure 5 in addition to the following: bobbins 112, mounted at a convenient place, are provided with concavely arcuate magnetic poles 113. These bobbins are electrically connected at one terminal to a battery 118 and at the other terminal to either roller 37 or 37ª. The other terminal of the battery 118 is grounded. Sectors 114 are pivotally mounted above the poles 113 and have their lower edges arcuately shaped to pass, upon rotation of the sectors, adjacent to the poles 113. Springs 114 are secured to the upper ends of the sectors to normally retain them in the position shown at the upper right hand in Figure 8. Contact rollers 115 are attached to the upper ends of the sectors and are adapted to make contact with contact shoes 116. The positive terminal of battery 117 is connected to a motor 118 which may control either the rudder, elevator, or an aileron, and the other terminal of this motor is connected to the contact shoe 116. The sector 114 is grounded. The other terminal of the battery 117 is connected to the contact roller 37ª of the control unit. As the wiring connections of the contacting roller shown in the lower right hand of Figure 8 are similar to those just described, except that the motor is connected to the other contact roller 37 of the control unit, the wiring of this element has not been shown. Upon movement of the plane out of the horizontal, either contact roller 37 or 37ª will make contact with its adjacent shoe 111, as previously set forth.

Assuming that the left-hand roller 37ª has made contact with the shoe 11, current will pass from the battery 118ª through the bobbin 112 to the roller 37ª, through the shoe 11 to ground, and as the terminal of the battery is grounded, the circuit will be closed through the bobbin 112. The magnetic flux thereby set up in the pole 113 will attract the sector 114 to substantially vertical position, closing the circuit from the battery 117 through the motor 118, contact shoe 116, roller 115, sector 114, to ground. The closing of the latter circuit will actuate the motor 118 which, as above mentioned, may be used to restore either of the three devices for guiding the aeroplane.

The unit illustrated in Figures 1 and 2 can be operated telegraphically through a system which receives electrical impulses from a point distant which may be moving or stationary, that is, by constructing a wireless unit which closes a circuit through the rollers 37 and 37ª mounted on the housings, through means of an electrical impulse conveyed from another plane or from a stationary location situated upon the ground.

It will be noted that the brake drum elements used with the units for moving the elevators, ailerons and rudder of an aircraft is so constructed that said drum is retained in locked position when the circuit is open and inoperative. It should also be noted that when the device is inactive and the pilot controls the manipulation of the control stick the drums and the units attached thereto, idle and move with the cables, which open the elevator, rudder and ailerons. These units may also be used to be controlled by a navigation apparatus which registers the speed (ground and air), altitude, and direction. With such a navigation apparatus, when the latter is set for a predetermined course the navigation apparatus will so correct or rectify the units as to constantly cause the controls to adjust the ailerons, elevators and rudder to steer true to this course predetermined by the navigation apparatus.

I claim:

1. In an aeroplane having a control surface, a member rigid with the aeroplane, a pendulum pivotally mounted on said member, a support rigid with said pendulum, contact shoes adjacent the ends of said support, members slidable in said support and adapted to contact with said shoes, means carried by said support for moving said slidable members along said support upon rotational movement of said rigid member, draft means connected to said control surface, electrical motive means, said draft means being attached to said motive means, a source of electrical energy, said motive means, slidable members, and contact shoes being in electrical circuit with said source, said circuit being closed upon contact of one of said slidable members with its adjacent shoe.

2. In an aeroplane having a control surface, a member rigid with the aeroplane, a pendulum pivotally mounted on said member, a support rigid with said pendulum, said support being secured at right-angles to said pendulum, contact shoes adjacent the ends of said support, members slidable in the ends of said support and adapted to contact with said shoes, means carried by said support for moving said slidable members along said support upon rotational movement of said rigid member, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

3. In an aeroplane having a control surface, a member rigid with the aeroplane, a pendulum pivotally mounted on said member, a housing rigid with said pendulum, contact shoes adjacent the ends of said housing, members slidably mounted in the ends of said housing and adapted to contact with said shoes, means carried by said housing for moving said slidable members in said housing upon rotational movement of said member, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

4. In an aeroplane having a control surface, a member rigid with the aeroplane, a pendulum pivotally mounted on said member, a support rigid with said pendulum, said support being secured at right-angles to said pendulum, arcuate contact shoes adjacent the ends of said support, members slidable in the ends of said support and adapted to contact with said shoes, means carried by said support for moving said slidable members along said support upon rotational movement of said rigid member, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

5. In an aeroplane having a control surface, a member rigid with the aeroplane, a pendulum pivotally mounted on said member, a housing rigid with said pendulum, contact shoes adjacent the ends of said housing, members slidably mounted in the ends of said housing and adapted to contact with said shoes, means mounted in said housing for moving said slidable members in said housing upon rotational movement of said member, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

6. In an aeroplane having a control surface, a member rigid with the aeroplane, a pendulum pivotally mounted on said member, a housing rigid with said pendulum, said housing being secured at right-angles to said pendulum, contact shoes adjacent the ends of said housing, members slidably mounted in the ends of said housing and adapted to contact with said shoes, means carried by said housing for moving said slidable members in said housing upon rotational movement of said member, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

7. In an aeroplane having a control surface, a member rigid with the aeroplane, a pendulum pivotally mounted on said member, a support rigid with said pendulum, contact shoes adjacent the ends of said support, bolts slidable in the ends of said support and adapted to contact with said shoes, means carried by said support for moving said slidable bolts along said support upon rotational movement of said member, draft means connected to said control surface, electrical motive means, said draft means attached to said motive means, a source of electrical energy, said motive means, slidable bolts, and shoes being in electrical circuit with said source, said circuit being closed upon contact of one of said slidable bolts with its adjacent shoe.

8. In an aeroplane having a control surface, an electrical motive means, draft means attached to said control surface and said motive means, an electrical source of energy, a unit comprising a casing, contact shoes oppositely disposed on the inner wall of said casing, a pendulum, a support pivotally mounted in said casing and rigid with said pendulum, members slidable along the ends of said support and adapted to contact with said shoes, means carried by said support for moving said slidable members along said support upon rotational movement of said casing, said motive means, slidable members, and shoes being in electrical circuit with said source, said circuit being closed upon contact of one of said slidable members with its adjacent shoe.

9. In an aeroplane having a control surface, an electrical motive means, draft means attached to said control surface and said motive means, an electrical source of energy, a unit comprising a casing, contact shoes oppositely disposed on the inner wall of said casing, a pendulum, a support rigid with and at right-angles to said pendulum, said support being pivotally mounted in said casing, members slidable in the ends of said support and adapted to contact with said shoes, means carried by said support for moving said slidable members along said support upon rotational movement of said casing, said motive means, slidable members, and shoes being in electrical circuit with said source, said circuit being closed upon contact of one of said slidable members with its adjacent shoe.

10. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted in said casing and rigid with said pendulum, members slidable in the ends of said housing and adapted to contact with said shoes, means carried by said housing for moving said slidable members in said housing upon rotational movement of said casing, said motive means, slidable members, and shoes being in electrical circuit with said source, said circuit being closed upon contact of one of said slidable members with its adjacent shoe.

11. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted in said casing and rigid with said pendulum, members slidable in the ends of said housing and adapted to contact with said shoes, means in said housing for moving said slidable members in said housing upon rotational movement of said casing, said motive means, slidable members, and shoes being in electrical circuit with said source, said circuit being closed upon contact of one of said slidable members with its adjacent shoe.

12. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted within said casing and rigid with said pendulum, said housing being secured at right-angles to said pendulum, members slidable in the ends of said housing and adapted to contact with said shoes, means in said housing for moving said slidable members in said housing upon rotational movement of said casing, said motive means, slidable members, and shoes being in electrical circuit with said source, said circuit being closed upon contact of one of said slidable members with its adjacent shoe.

13. In an aeroplane having a control surface, a pendulum, a housing rigid with said pendulum, contact shoes adjacent the ends of said housing, members slidable in the ends of said housing and adapted to contact with said shoes, rack bars engaging said slidable members and adapted to move said members in said housing, means for actuating said rack bars upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

14. In an aeroplane having a control surface, a pendulum, a housing rigid with said pendulum, contact shoes adjacent the ends of said housing, members slidable in the ends of said housing and adapted to contact with said shoes, rack bars engaging said slidable members and adapted to move said members in said housing, gears carried by said housing for actuating said rack bars to move said slidable members, means for rotating said gears upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

15. In an aeroplane having a control surface, a pendulum, a casing, a housing rigid with said pendulum and pivotally mounted in said casing, contact shoes adjacent the ends of said housing, members slidable in the ends of said housing and adapted to contact with said shoes, rack bars movable longitudinally in said housing engaging said slidable members, gears meshing with said rack bars, means rigid with said casing engaging said gears and adapted to rotate the latter to move said slidable members into contact with said shoes upon rotational movement of the casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

16. In an aeroplane having a control surface, a pendulum, a casing, a housing rigid with said pendulum and pivotally mounted in said casing, said housing having opposed open ends, contact shoes adjacent the ends of said housing, bolts slidable in the ends of said housing and adapted to contact with said shoes, a rack bar engaging each slidable bolt, a shaft on each side of said housing, a gear on each shaft engaging its adjacent rack bar, and means rigid with said casing for rotating said gear to cause said slidable members to move in said housing upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

17. In an aeroplane having a control surface, a casing, a pendulum, a housing rigid with said pendulum and rotatably mounted in said casing, said housing having opposed open ends, contact shoes adjacent the ends of said housing, bolts slidable in the ends of said housing and adapted to contact with said shoes, a rack bar in each side of said housing engaging one of said slidable bolts, a shaft on each side of said housing, a gear on each shaft engaging its adjacent rack bar, additional gear means on each shaft, means mounted rigid in said casing engaging said additional gear means to move said rack bars upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

18. In an aeroplane having a control surface, a casing, a pendulum, a housing rigid with said pendulum and rotatably mounted in said casing, said housing having opposed open ends, contact shoes adjacent the ends of said housing, bolts slidable in the ends of said housing and adapted to contact with said shoes, a rack bar engaging each slidable bolt, a shaft on each side of said housing, a gear on each shaft engaging its adjacent rack bar, additional gears on said shafts, a gear rigid with said casing engaging the additional gears on said shafts for rotating the gears on said shafts upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

19. In an aeroplane having a control surface, a casing, a pendulum, a housing rigid with said pendulum, said housing having opposing open ends and being rotatably mounted in said casing, contact shoes adjacent the ends of said housing, a slidable bolt mounted in each opposing end of said housing and adapted to contact with its adjacent shoe, means mounted in said housing engaging said slidable bolts to simultaneously extend one of said bolts into contact with its complemental shoe and retract the other of said bolts into said housing, means engaging said first-named means for actuating the latter upon rotational movement of said casing, draft means connected to said control surface, electrical motive means, said draft means attached to said motive means, a source of electrical energy, said motive means, slidable members and shoes being in electrical circuit with said source, said circuit being closed upon contact of one of said slidable members with its adjacent shoe.

20. In an aeroplane having a control surface, a casing, a pendulum, a housing rigid with said pendulum mounted in said casing, said housing having opposed open ends, contact shoes adjacent the ends of said housing, bolts slidable in the ends of said housing adapted to contact with said shoes, a shaft rotatably mounted in said casing and rigidly supporting said housing intermediate its ends, a gear rigidly mounted in said casing co-axial with said shaft, means engaging said gear and slidable bolts for simultaneously retracting one of said bolts and extending the opposite bolt into contact with its adjacent shoe upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

21. In an aeroplane having a control surface, a casing, a pendulum, a housing rigid with said pendulum and rotatably mounted in said casing, said housing having opposed open ends, contact shoes adjacent the ends of said housing, bolts slidable in the ends of said housing and adapted to contact with said shoes, a straight rack bar engaging each slidable bolt, each of said rack bars having teeth on the upper side, and rack bars extending longitudinally in the housing, a shaft on each side of said housing, a gear on each shaft engaging its adjacent rack bar, additional gears on said shaft, a gear rigid with said casing engaging the additional gears on said shafts for rotating the gears on said shafts upon movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

22. In an aeroplane having a control surface, a casing, a pendulum, a housing rigid with said pendulum mounted in said casing, said housing having opposed open ends, contact shoes adjacent the ends of said housing, bolts slidable in the ends of said housing adapted to contact with said shoes, a shaft rotatably mounted in said casing and rigidly supporting said housing intermediate its length, a gear rigidly mounted in said casing co-axial with said shaft, gear means carried by said housing engaging said rigid gear and the slidable bolts for simultaneously retracting one of said bolts and extending the opposite bolt into contact with its adjacent shoe upon movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

23. In an aeroplane having a control surface, a casing, a pendulum, a housing rigid with said pendulum and rotatably mounted in said casing, said housing having opposed open ends, contact shoes adjacent the ends of said housing, bolts slidable in the ends of said housing and adapted to contact with said shoes, a straight rack bar engaging each slidable bolt, said rack bars having teeth on the upper side, said rack bars being movable longitudinally in said housing, a shaft on each side of said housing, a gear on each shaft within said housing engaging its adjacent rack bar, an additional gear on the end of said shaft, a gear rigid with said casing, engaging the additional gear on the end of said shaft for rotating the gears on said shafts upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

24. In an aeroplane having a control surface, a casing, a pendulum, a housing rigid with said pendulum mounted in said casing, said housing having opposed open ends, contact shoes adjacent the ends of said housing, bolts slidable in the ends of said housing adapted to contact with said shoes, means in said housing for actuating said bolts, a shaft rotatably mounted in said casing and rigidly supporting said housing intermediate its length, a gear rigidly mounted in said casing co-axial with said shaft, a shaft rotatably mounted in said housing on each side of said first-named shaft, said last-named shaft extending through the housing, a gear rigidly mounted on the end of said last-named shaft exterior of said housing and movable with said housing engaging said rigid gear, an additional gear rigid on said last-named shaft intermediate its ends in said housing engaging said means for simultaneously retracting one of said bolts and extending the opposite bolt into contact with its adjacent shoe upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

25. In an aeroplane having a control surface, a pendulum, a shaft rotatably mounted in said casing, a housing rigidly mounted on said shaft, said housing having opposed open ends, contact shoes adjacent the ends of said housing, bolts slidable in the ends of said housing adapted to contact with said shoes, a straight rack bar engaging each slidable bolt, said rack bar having teeth on the upper side and being movable longitudinally in said housing, a shaft on each side of said housing, a gear on each shaft within said housing engaging its adjacent rack bar, an additional gear on the end of said shaft, a gear rigidly mounted in said casing coaxial with said shaft engaging the additional gear on the end of said shaft, means for rotating the gears on said shafts upon rotational movement of said casing, draft means connected to said control surface, electrical motive means, said draft means attached to said motive means, a source of electrical energy, said motive means, slidable members, and shoes being in electrical circuit with said source, said circuit being closed upon contact of one of said slidable members with its adjacent shoe.

26. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted in said casing and rigid with said pendulum, said housing being secured at right-angles to said pendulum, members slidable in the ends of said housing and adapted to contact with said shoes, a pinion mounted on each of said slidable members, a rack bar in said housing engaging each pinion for moving the adjacent slidable member in said housing upon rotational movement of said casing, means for retarding rotation of said pinion, said motive means, slidable members, and shoes being in electrical circuit with said source, said circuit being closed upon contact of one of said slidable members with its adjacent shoe.

27. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted in said casing and rigid with said pendulum, said housing being secured at right-angles to said pendulum, members slidable in the end of said housing and adapted to contact with said shoe, a pinion mounted on each of said slidable members, a rack bar in said housing engaging each pinion for moving the adjacent slidable member in said housing upon rotational movement of said casing, friction means for retarding rotation of said pinion, means for adjusting said friction means, said motive means, slidable members, and shoes being in electrical circuit with said source, said circuit being closed upon contact of one of said slidable members with its adjacent shoe.

28. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted within said casing and rigid with said pendulum, said housing being secured at right-angles to said pendulum, rack bars in said housing, bolts slidable in the ends of said housing and adapted to contact with said shoes, a pinion on each bolt engaging the adjacent rack bar, and a spring adjacent each pinion frictionally engaging said pinion to retard the pinion against free rotation, said motive means, slidable members, and shoes being in electrical circuit with said source, said circuit being closed upon contact of one of said slidable members with its adjacent shoe.

29. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted within said casing and rigid with said pendulum, said housing being secured at right-angles to said pendulum, rack bars in said housing, bolts slidable in the ends of said housing and adapted to contact with said shoes, a pinion on each bolt engaging the adjacent rack bar, a spring adjacent each pinion frictionally engaging said pinion to retard the pinion against free rotation, means for adjusting the force of said spring, said motive means, slidable members, and shoes being in electrical circuit with said source, said circuit being closed upon contact of one of said slidable members with its adjacent shoe.

30. In an aeroplane having a control surface, an electrical motive means, draft means attached to said control surface and said motive means, an electrical source of energy, a unit comprising a casing, contact shoes oppositely disposed on the inner wall of said casing, a pendulum, a housing pivotally mounted within said casing and rigid with said pendulum, said housing being secured at right-angles to said pendulum, bolts slidable in the ends of said housing and adapted to contact with said shoes, racks in said housing for moving said bolts in said housing, means for actuating said racks upon rotational movement of said casing, means on the bolts engaging said racks for moving the bolts a lesser lineal distance than the racks upon movement of the first-named means, said motive means, slidable members, and shoes being in electrical circuit with said source, said circuit being closed upon contact of one of said slidable members with its adjacent shoe.

31. In an aeroplane having a control surface, a casing, a pendulum, a housing rigid with said pendulum and rotatably mounted in said casing, said housing having opposed open ends, contact shoes adjacent the ends of said housing, bolts slidable in the ends of said housing and adapted to contact with said shoes, a straight rack bar engaging each slidable bolt, said rack bars extending longitudinally in the housing, a shaft on each side of said housing, a gear on each shaft engaging its adjacent rack bar, additional gears on said shafts for rotating the gears on said shafts upon movement of said casing, draft means connected to said control surface, an electrical motive means, said draft means attached to said motive means, a source of electrical energy, said motive means, slidable members, and shoes being in electrical circuit with said source, said circuit being closed upon contact of one of said slidable members with its adjacent shoe.

In testimony whereof I affix my signature.

CHRISTIAN GROH.